United States Patent
Montemayor et al.

(10) Patent No.: US 11,895,101 B2
(45) Date of Patent: Feb. 6, 2024

(54) MACHINE LEARNING DEVELOPMENT HUB

(71) Applicant: Dell Products, L.P., Round Rock, TX (US)

(72) Inventors: Francisco Garcia Montemayor, Cedar Park, TX (US); Leandro Lopes, Austin, TX (US); Thiagarajan Ramakrishnan, Round Rock, TX (US); Robert Mujica, Dublin (IE)

(73) Assignee: DELL PRODUCTS, L.P., Round Rock, TX (US)

( * ) Notice: Subject to any disclaimer, the term of this patent is extended or adjusted under 35 U.S.C. 154(b) by 177 days.

(21) Appl. No.: 17/532,708

(22) Filed: Nov. 22, 2021

(65) Prior Publication Data

US 2023/0161565 A1   May 25, 2023

(51) Int. Cl.
*G06F 8/34* (2018.01)
*H04L 9/40* (2022.01)
*G06N 20/00* (2019.01)
*G06F 3/048* (2013.01)
*G09B 5/00* (2006.01)
(Continued)

(52) U.S. Cl.
CPC ............ *H04L 63/067* (2013.01); *G06F 3/048* (2013.01); *G06F 8/34* (2013.01); *G06N 20/00* (2019.01); *G06Q 10/10* (2013.01); *G06T 3/0093* (2013.01); *G09B 5/00* (2013.01); *G10L 15/30* (2013.01); *H04L 9/3215* (2013.01)

(58) Field of Classification Search
CPC ......... G06F 8/34; G06F 3/048; H04L 63/067; H04L 9/3215; G06N 20/00; G06Q 10/10; G09B 5/00; G06T 3/0093; G10L 15/30
See application file for complete search history.

(56) References Cited

U.S. PATENT DOCUMENTS

2015/0379429 A1* 12/2015 Lee .................... G09B 5/00
706/11
2017/0012951 A1* 1/2017 Mennes ............... H04L 9/3215
(Continued)

OTHER PUBLICATIONS

KR 101696904, (translation), Jan. 17, 2017, 29 pgs <KR_101696904.pdf>.*

(Continued)

*Primary Examiner* — Tuan A Vu

(74) *Attorney, Agent, or Firm* — Amin, Turocy & Watson, LLP

(57) ABSTRACT

The described technology is generally directed towards a machine learning development hub, and corresponding methods and computer readable media. The machine learning development hub can comprise a machine learning development platform complete with various tools for various stages of machine learning development. The machine learning development hub can furthermore comprise translation functions to translate received inputs into inputs to other machine learning development platforms. The machine learning development hub can collect credentials for the other machine learning development platforms and can connect to the other machine learning development platforms via their respective interfaces, in order to supply inputs and instructions thereto. The machine learning development hub can encrypt its communications to other machine learning development platforms to secure its interactions.

20 Claims, 10 Drawing Sheets

(51) Int. Cl.
　　　*G06T 3/00*　　　(2006.01)
　　　*G10L 15/30*　　(2013.01)
　　　*G06Q 10/10*　　(2023.01)
　　　*H04L 9/32*　　　(2006.01)

(56) References Cited

U.S. PATENT DOCUMENTS

| | | | | |
|---|---|---|---|---|
| 2018/0089591 | A1* | 3/2018 | Zeiler | G06F 3/048 |
| 2021/0203880 | A1* | 7/2021 | Ahn | G10L 15/30 |
| 2022/0122306 | A1* | 4/2022 | Lin | G06T 3/0093 |
| 2022/0357977 | A1* | 11/2022 | Kalou | G06Q 10/10 |

OTHER PUBLICATIONS

"Frontiers in Massive Data Analysis," National Research Council, Washington, DC: The National Academies, 2013, 191 pages.

Sculley et al., "Hidden Technical Debt in Machine Learning Systems," Advances in Neural Information Processing Systems 28 (NIPS 2015), 9 pages.

"Domino—Architecture," https://admin.dominodatalab.com/en/4.2/architecture.html, accessed Nov. 22, 2021, 6 pages.

"Compare Domo and Teradata Vantage, " https://www.g2.com/compare/domo-vs-teradata-teradata-vantage, accessed Nov. 22, 2021, 10 pages.

"AWS—Predictive Data Science with Amazon SageMaker and a Data Lake on AWS," https://aws.amazon.com/quickstart/architecture/predictive-data-science-sagemaker-and-data-lake/, accessed Nov. 22, 2021, 5 pages.

Stiefel, "What's New in Azure Machine Learning?" InfoQ, https://www.infoq.com/news/2018/05/Azure-Machine-Learning-New/, May 9, 2018, 3 pages.

"Kubeflow—Overview of Kubeflow Pipelines," https://www.kubeflow.org/docs/components/pipelines/overview/pipelines-overview/, accessed Nov. 22, 2021, 5 pages.

"Plutora—DevOps Terminology: A Glossary," https://www.plutora.com/devops-at-scale/terminology-glossary, accessed Nov. 22, 2021, 23 pages.

Lakshminarayan et al., "Enterprise-wide Machine Learning using Teradata Vantage: An Integrated Analytics Platform," 2019 IEEE International Conference on Big Data (Big Data), Dec. 9-12, 2019, 4 pages.

\* cited by examiner

MACHINE LEARNING DEVELOPMENT HUB

TECHNICAL FIELD

The subject application generally relates to software development, and more particularly, to tools for developing artificial intelligence and machine learning systems.

BACKGROUND

Data scientists tasked with developing machine learning systems have a large number of different tools and platforms available to them. Examples tools include those offered by Domino Data Labs such as Domino Platform and Domino Compute. Amazon Web Services (AWS) also provides a variety of tools, including Amazon S3, Amazon's API Gateway, AWS Lambda, Amazon Kinesis Data streams, and Amazon Kinesis Data Firehose. Microsoft offers the Microsoft Azure Machine Learning (ML) platform. Kubeflow offers the Kubeflow Pipeline.

The proliferation of available tools provides options for machine learning development, however, it also leads to problems. Data scientists are presented with deciding on the best tools for various tasks such as fetching data, building models, and running inferences on top of pre-built models. To use all the available tools, data scientists must develop expertise in containers, Kubernetes, data security, endpoints, scaling, persistent volumes, graphical processing units (GPUs), DevOps, programming in various languages, use of various tools, etc. This leads to a slower development process, even for relatively simple tasks such as testing simple customer use cases.

Vendor fragmentation and enterprise silos have created an unnecessarily complex infrastructure. This complex infrastructure delays the time to onboard legacy and new software. Also, for many available tools, leveraging innovative open source is unfortunately not possible, given vendor specific dependencies.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
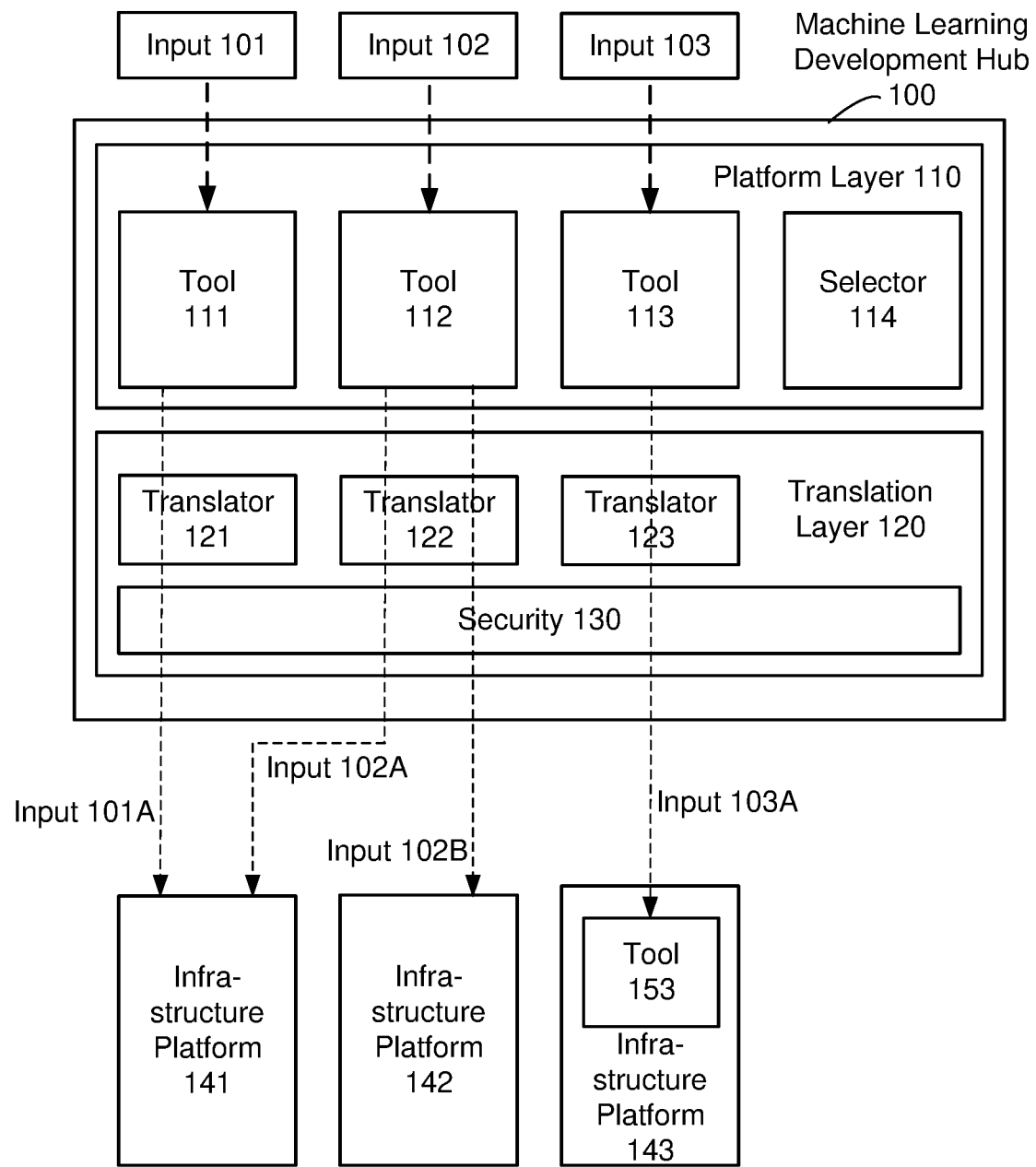
FIG. 1 illustrates an example machine learning development hub, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to a machine learning development hub, and corresponding methods and computer readable media. The machine learning development hub can comprise a machine learning development platform complete with various tools for various stages of machine learning development. The machine learning development hub can furthermore comprise translation functions to translate received inputs into inputs to other machine learning development platforms. The machine learning development hub can collect credentials for the other machine learning development platforms and can connect to the other machine learning development platforms via their respective interfaces, in order to supply inputs and instructions thereto. The machine learning development hub can encrypt its communications to other machine learning development platforms to secure its interactions. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

FIG. 1 illustrates an example machine learning development hub, in accordance with one or more embodiments described herein. The example machine learning (ML) development hub 100 includes a platform layer 110 and a translation layer 120. The platform layer 110 includes example tools 111, 112, 113 and a selector 114. The translation layer 120 includes example translators 121, 122, 123 and security 130. FIG. 1 furthermore comprises example infrastructure platforms 141, 142, 143, wherein infrastructure platform 143 comprises example tool 153.

Figure 3:
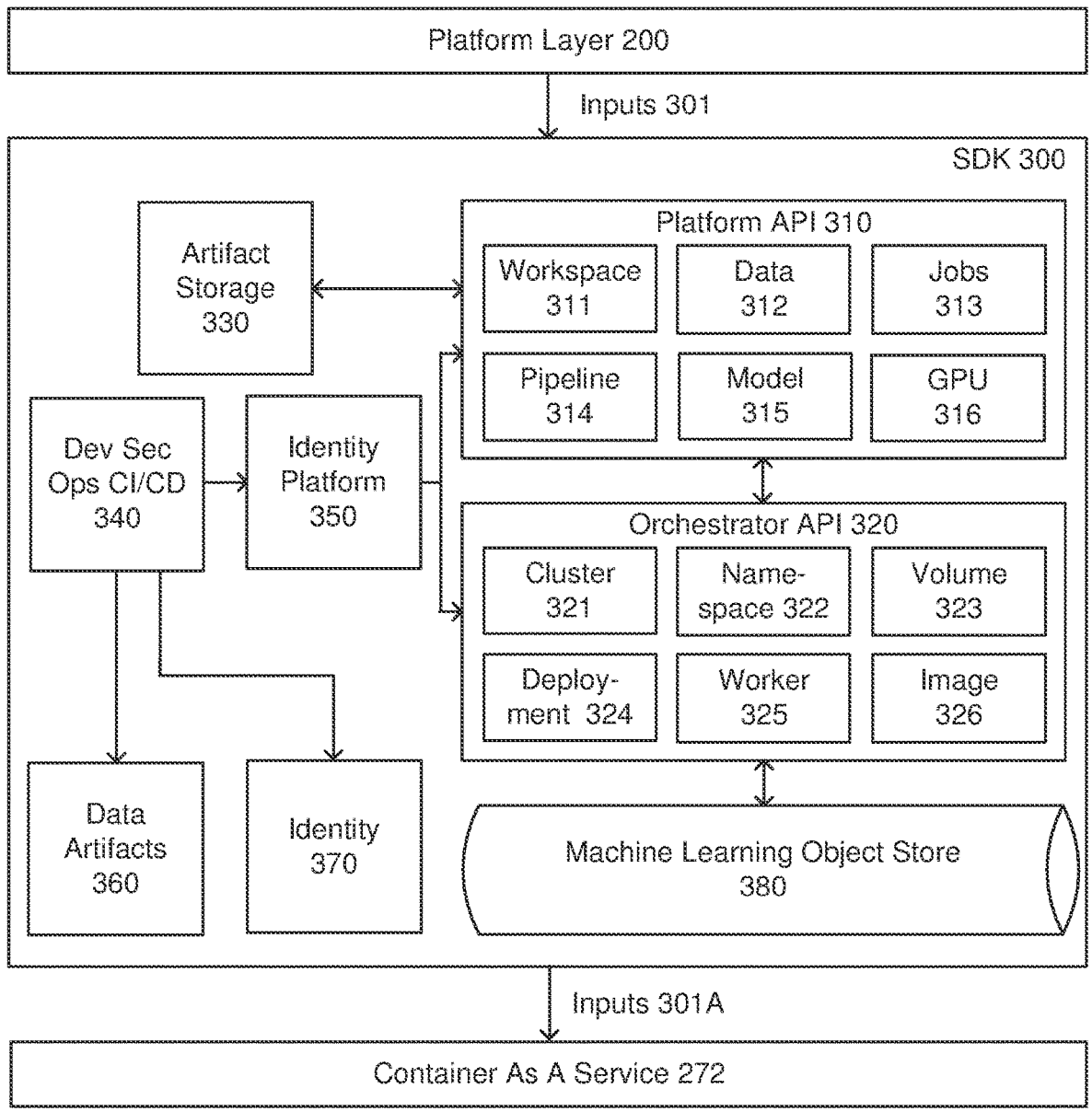
FIG. 3 illustrates an example software development kit (SDK) layer of a machine learning development hub, in accordance with one or more embodiments described herein.

In example operations according to FIG. 3, the tools 111, 112, 113 in the platform layer 110 can be provided to a user via a user interface. The user can interact with tools 111, 112, 113, and the user interactions and/or data provided via the tools 111, 112, 113 can be received as inputs 101, 102, and 103. The translation layer 120 can translate the inputs 101, 102, and 103 into translated inputs 101A, 102A, 102B, and 103A, and provide the translated inputs 101A, 102A, 102B, and 103A to infrastructure platforms 141, 142, and 143. The translation layer 120 can be configured to access Application Programming Interfaces (APIs) for each of the infrastructure platforms 141, 142, and 143, and the translation layer 120 can supply the translated inputs 101A, 102A, 102B, and 103A to the infrastructure platforms 141, 142, and 143 via applicable APIs.

The infrastructure platforms 141, 142, and 143 can include any platforms available for machine learning development, whether such platforms are now in use or developed in the future. For example, the infrastructure platforms 141, 142, and 143 can include the platforms discussed in the background section, such as Domino Platform, Domino Compute, Amazon S3, Amazon's API Gateway, AWS Lambda, Amazon Kinesis Data streams, Amazon Kinesis Data Firehose, Microsoft Azure ML platform, Kubeflow Pipeline, and any other such ML development tools and platforms. The translation layer 120 can include translators 121, 122, 123 that are configured to translate inputs 101, 102, 103 into translated inputs 101A, 102A, 102B, and 103A that are structured and formatted for use by the target infrastructure platforms 141, 142, and 143. Security 130 can use stored credentials, such as stored usernames and passwords, to gain access to the infrastructure platforms 141, 142, and 143, so that translated inputs 101A, 102A, 102B, and 103A can be supplied in connection with appropriate user accounts. Security 130 can also be configured to encrypt transmissions of translated inputs 101A, 102A, 102B, and 103A as described herein.

In some embodiments, the selector 114 can be configured to receive user selections of target infrastructure platforms 141, 142, and 143 for the tools 111, 112, 113. For example, the infrastructure platform 141 can be selected as a target for tool 111. The infrastructure platforms 141 and 142 can be selected as targets for tool 112. The infrastructure platform 143, and more specifically, the tool 153 can be selected as a target for tool 113. The selector 114 can then configure the platform layer 110 and the translation layer 120 to apply appropriate translators 121, 122, 123 in connection with translating inputs 101, 102, 103 received by tools 111, 112, 113. The selector 114 can also be configured to receive and store user credentials for each of the infrastructure platforms 141, 142, and 143, for use by security 130.

In general, with reference to FIG. 1, the ML development hub 100 can be configured to interact with multiple different infrastructure platforms 141, 142, and 143 on behalf of users, so that users can interact with the ML development hub 100, and the ML development hub 100 can handle the details associated with interactions with the infrastructure platforms 141, 142, and 143 on the user's behalf. In some embodiments, the ML development hub 100 can be implemented at least in part by a software development kit (SDK) as described herein. The SDK can allow teams to create and update translation technologies, such as translators 121, 122, 123, to work with different tools 111, 112, 113 and infrastructure platforms 141, 142, and 143. While not illustrated in FIG. 1, the platform layer 110 can also optionally include freestanding tools which can operate exclusively within the platform layer 110, without supplying translated inputs to infrastructure platforms 141, 142, and 143.

Data practitioners at large-scale enterprises realize that gathering intelligence from data is an integral part of analytics operations. Some of the advantages that can be achieved by embodiments of this disclosure include efficient access to compute, storage, open source and data access; the ability to rapidly bootstrap re-usable ML components with best practices that meet an organization's security, governance and compliance requirements; the ability to rapidly on-board legacy and new software; the provision of high-level APIs that pre-configure infrastructure resources with defaults and expedite building and deployment of applications without need for specialized platform knowledge; the ability to access many proprietary technology silos while maintaining environment controls that ensure data privacy and security; and the acceleration of development processes through enhanced familiarity with features for tasks such as launching loops, conditions, objects and statements to run production ML workloads.

Some example inputs 101, 102, 103 can comprise, e.g., compute inputs that can specify computing resources to be used for ML models. Other example inputs 101, 102, 103 can comprise storage inputs that specify storage locations, formats, and other parameters for storing data used by ML models. Other example inputs 101, 102, 103 can comprise data inputs that specify data to be used by ML models as well as any data parameters or other requirements. Other example inputs 101, 102, 103 can comprise open source inputs that specify open source to be used in connection with ML models, and data access inputs that specify data access for ML models.

Figure 2:
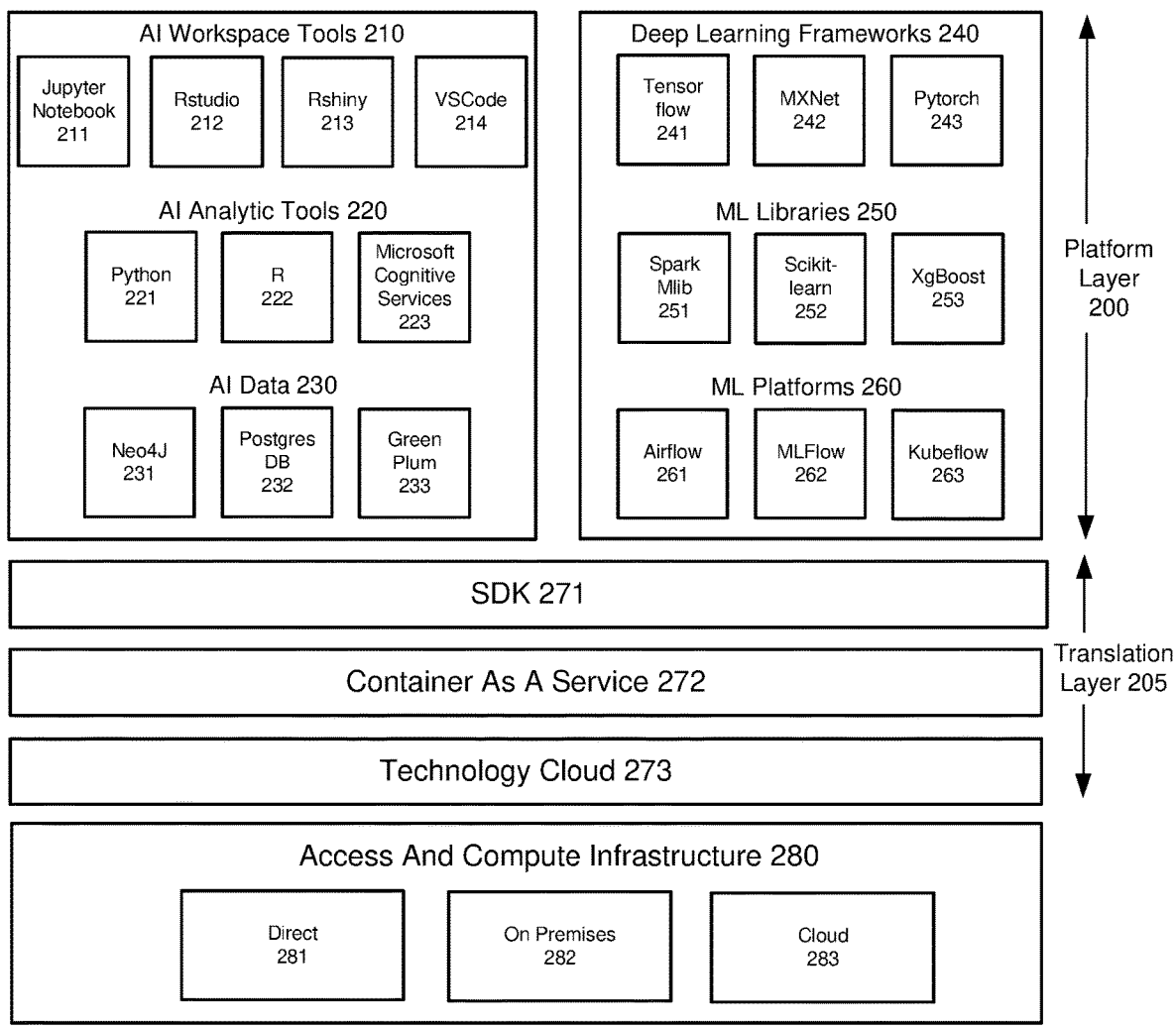
FIG. 2 illustrates an architectural overview including example technologies that can interact to provide a machine learning development hub, in accordance with one or more embodiments described herein.

FIG. 2 illustrates an architectural overview including example technologies that can interact to provide a machine learning development hub, in accordance with one or more embodiments described herein. The platform layer 200 and translation layer 205 illustrated in FIG. 2 can implement a platform layer 110 and translation layer 120, resepectively, such as introduced in FIG. 1.

The example platform layer 200 includes various tools, data, frameworks, libraries and platforms, which are referred to generally as tools 111, 112, 113 in FIG. 1. For example, platform layer 200 includes AI workspace tools 210, AI analytic tools 220, AI data 230, deep learning frameworks 240, ML libraries 250, and ML platforms 260. Example AI workspace tools 210 include Jupyter Notebook 211, Rstudio 212, Rshiny 213, and VSCode 214. Example AI analytic tools 220 can include Python 221, R 222, and Microsoft Cognitive Services 223. Example AI data 230 can include Neo4J 231, Postgres DB 232, and GreenPlum 233. Example deep learning frameworks 240 can include Tensor flow 241, MXNet 242, and Pytorch 243. Example ML libraries 250 can include Spark Mlib 251, Sckkit-learn 252, and XgBoost 253. Example ML platforms 260 can include Airflow 261, MLFlow 262 and Kubeflow 263. These various tools illustrated in the platform layer 200 are familiar to data practitioners, however the aggregation of these tools on a platform that can translate inputs to the tools and provide translated inputs to other platforms as needed, with appropriate security, is a novel aspect of the architecture illustrated in FIG. 2.

The example translation layer 205 includes an SDK 271, a container as a service (CaaS) layer 272, and a technology cloud 273. The operation of the SDK 271 is described further in connection with the example SDK illustrated in FIG. 4. Translated inputs produced by the SDK 271 with support of the CaaS layer 272 and technology cloud 273 can be provided to access and compute infrastructure 280. The access and compute infrastructure 280 can include, e.g., infrastructure platforms 141, 142, and 143 illustrated in FIG. 1. In FIG. 2, the access and compute infrastructure 280 is illustrated as including direct resources 281, on premises resources 282, and cloud resources 283. The division of access and compute infrastructure 280 into the example categories 281, 282, and 283 demonstrates that an ML development hub 100 can cooperate with various types of infrastructure, whether such infrastructure is directly available (direct 281) to the ML development hub 100, e.g., in a same cluster as ML development hub 100, or available within a same organization (on premises 282), or available via cloud services (cloud 283).

With an SDK 271 such as depicted in FIG. 2, ML developers can coordinate across compute, storage, open source and data using single components of platform layer 200 to access the access and compute infrastructure 280. This enables data science teams to deploy AI & ML models at scale, allowing them to re-use known solutions, while at the same time contributing solutions to a central marketplace of re-usable products. Users can develop models on their local machines, train them using graphics processing units (GPUs) on a cloud and serve them in any desired private or public cloud with optimal tools such as Airflow and others, as illustrated.

The SDK 271 can enable options for leveraging existing re-usable productivity tools and frameworks during entire ML lifecycles, from data collection, pre-processing, training, testing, and experimentation, to data visualization. The SDK 271 can furthermore enable rapid experimentation and testing of ML models to analyze the performance of the ML models.

FIG. 3 illustrates an example software development kit (SDK) layer of a machine learning development hub, in accordance with one or more embodiments described herein. The example SDK 300 can implement, e.g., the SDK 271 introduced in FIG. 2. The SDK 300 can receive inputs 301 from platform layer 200, e.g., the platform layer 200 shown in FIG. 2, and the SDK 300 can produce the inputs 301A for further processing by the CaaS 272, e.g., the CaaS 272 shown in FIG. 2. The inputs 301 can comprise, e.g., inputs such as 101, 102, 103 shown in FIG. 1, and the inputs 301A can comprise, e.g., inputs such as 101A, 102A, 102B, and 103A shown in FIG. 1.

The example SDK 300 generally comprises a platform API 310 configured for interactions with the platform layer 200, and an orchestrator API 320 configured to interact with the platform API 310, orchestrate translations, and interact with downstream infrastructure such as CaaS 272. The example platform API 310 can comprise components such as workspace 311, data 312, jobs 313, pipeline 314, model 315, and GPU 316. The example orchestrator API 320 can comprise components such as cluster 321, namespace 322, volume 323, deployment 324, worker 325, and image 326.

The platform API 310 can interact with artifact storage 330, wherein artifact storage 330 can store artifacts such as images for use in provisioning a platform layer 200 user interface. The orchestrator API 320 can interact with machine learning object store 380. The platform API 310 and the orchestrator API 320 can interact with identity platform 350, wherein the identity platform 350 can comprise, e.g., a Koa identity platform or other similar technology that can implement security 130, introduced in FIG. 1.

The identity platform 350, data artifacts 360, and identity 370 can all be continuously updated by development security operations continuous integration, continuous delivery (CI/CD) 340.

In general, with regard to FIG. 3, the SDK 300 can be used to create workspaces, run jobs, and/or run services using a domain language. Any credentials required to securely access various components of the infrastructure (e.g., access and compute infrastructure 280) can be stored in a key-value store, e.g., a Vault key-value store. Images used for provisioning workspaces, images, pipelines, etc. can be stored in a registry service, e.g. a Harbor registry service. Interactions between components in the APIs 310, 320 can also secured using the identity platform 350.

With CI/CD practices enforced while deploying and delivering feature improvements for modules, the core components of a shared library provided by SDK 300 can be the platform API 310 and the orchestrator API 320. With regard to the platform API 310, requests sent by a data practitioner can be routed via the platform API 310, which can classify the request type sent by the user and store metadata associated with the request in a data store.

With regard to the orchestrator API 320, based on requests received from platform API 310, orchestrator API 320 can interact with CaaS 272, e.g., a KubeAPI server of a Kubernetes cluster, in order to fulfill specifications for creating workspaces, accessing services or frameworks within the infrastructure 280, or launching jobs using CPUs or GPUs. A set of controllers in the orchestrator API 320 can execute containers within CaaS 272 as needed to complete the pipeline specified by the user.

With regard to managing ML artifacts, data artifacts 360 can be configured to assist data scientist management of personal buckets, which the SDK 300 can provide as a part of each user's workspace. Typical moments, or stages, where users would rely on buckets include, after transforming a sample dataset, when they version it and upload it to the bucket (labeling the artifact as a dataset); after training a model, when they pickle it and upload it to the bucket (labeling the artifact as a model); during model drift analysis, when they download a current model from a bucket to compare results; and to publish a model as an API from a different environment, when they download a best model from a bucket for exposure. In order to access a storage piece of the infrastructure, data scientists can import artifacts into the SDK 300 and pass a token to authorize a user to access to the object storage. This ensures that user has sufficient privileges to simply upload and download data from their machine learning object store 380.

With regard to training of ML models and the computing resources, such as GPUs, used for such training, the jobs 313 and GPU 316 modules can help data scientists train models faster by allowing users to burst out code that requires significant computational power. With a valid private token, the jobs 313 module can be configured to directly deploy code to execute to Kubernetes clusters within CaaS 272. Users can then check their logs on the clusters, e.g., by using methods such as training.logs( ), and training.status( ) methods. Similarly, the GPU 316 module can be used to deploy models in a GPU farm. In some embodiments, training also can be done in parallel while using the SDK 300 to fine-tune user models.

FIG. 3 can provide a novel framework that supports a diversity of analytical tools, model registries, metadata and data stores, model serving and workflows pieced together. FIG. 3 can streamline access to compute and data storage, thus helping data science teams to launch their business applications faster from inception to production. FIG. 3 can also support reusable architecture and efficiencies in line-of-sight with GPU pooling and data cold storage strategies. Novel elements of the illustrated framework bring to bear automated model building, serving, deployment, storage and inference over time, over a single common framework supported by the SDK 300.

Figure 4:
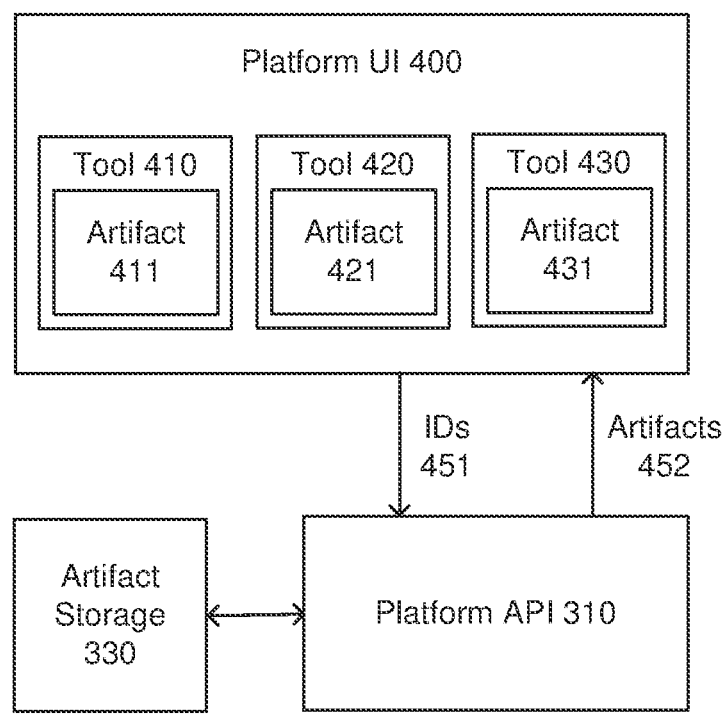
FIG. 4 illustrates example provisioning of artifacts to a machine learning development hub user interface, in accordance with one or more embodiments described herein.

FIG. 4 illustrates example provisioning of artifacts to a machine learning development hub user interface, in accordance with one or more embodiments described herein. FIG. 4 illustrates an example platform UI 400 comprising various tools, e.g. tool 410, tool 420, and tool 430. Each of the tools 410, 420, and 430 can make use of an artifact, for example tool 410 can make use of artifact 411, tool 420 can make use of artifact 421, and tool 430 can make use of artifact 431. The artifacts 411, 421, 431 can comprise, e.g. images or other data employed by UI elements of tools 410, 420, and 430.

FIG. 4 furthermore illustrates platform API 310 and artifact storage 330, previously introduced in FIG. 3. The platform UI 400 can be supported by platform 200, also illustrated in FIG. 3. The platform UI 400 can be configured to provide identifiers (IDs) 451 to the platform API 310. The IDs 451 can correspond to the tools 410, 420, and 430 or the artifacts 411, 421, 431. The platform API 310 can be configured to use the IDs 451 to retrieve the artifacts 411, 421, 431 from the artifact storage 330, and the platform API 310 can supply the artifacts 411, 421, 431 to the platform UI 400 in order to provision the platform UI 400 and tools 410, 420, and 430.

Figure 5:
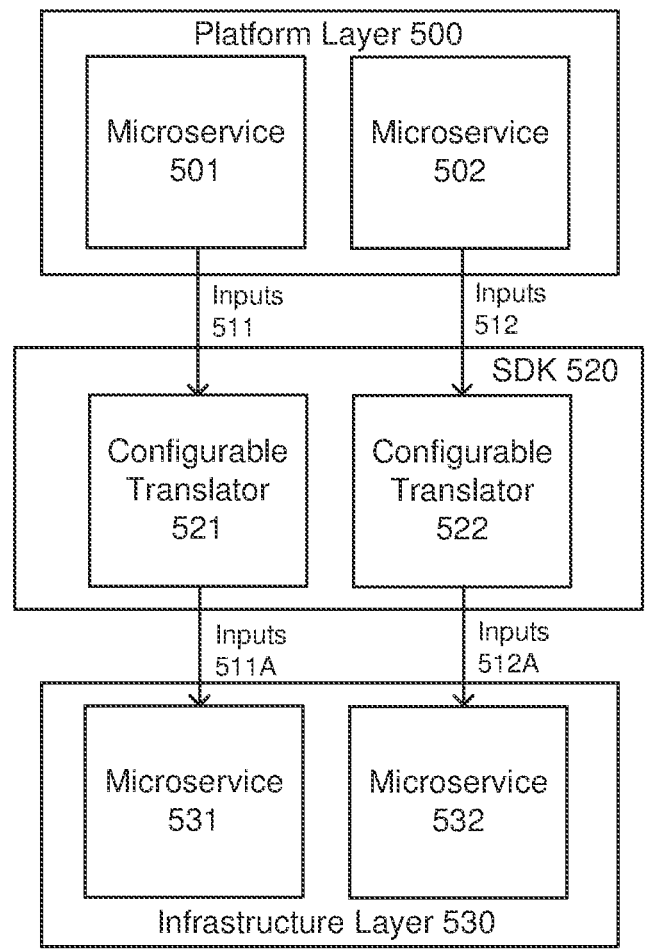
FIG. 5 illustrates example mediation of communications between microservices, in accordance with one or more embodiments described herein.

FIG. 5 illustrates example mediation of communications between microservices, in accordance with one or more embodiments described herein. FIG. 5 includes a platform layer 500 comprising example microservices 501 and 502, an SDK 520 comprising example configurable translators 521 and 522, and an infrastructure layer 530 comprising example microservices 531 and 532.

In FIG. 5, the platform layer 500 can implement, e.g., a platform layer 110 or 200. The SDK 520 can implement, e.g., an SDK 271 or 300. The infrastructure layer 530 can implement, e.g., the access and compute infrastructure 280. Platform layer 500 can include or reference microservices 501 and 502, which correspond to microservices 531 and 532 supported in the infrastructure layer 530.

FIG. 5 illustrates an SDK 520 that can be equipped with configurable translators 521, 522 that can be updated as needed to support translation of inputs 511, 512 associated with microservices 501, 502 in the platform layer 500 into inputs 511A, 512A provided to microservices 531, 532 in the infrastructure layer 530. Furthermore, the SDK 520 can be configured to automatically or semi-automatically translate inputs 511, 512 into inputs 511A, 512A and provide inputs 511A, 512A to corresponding microservices 531, 532. In some embodiments, the SDK 520 can secure transmissions of inputs 511A, 512A using dynamically generated encryption keys.

Figure 6:
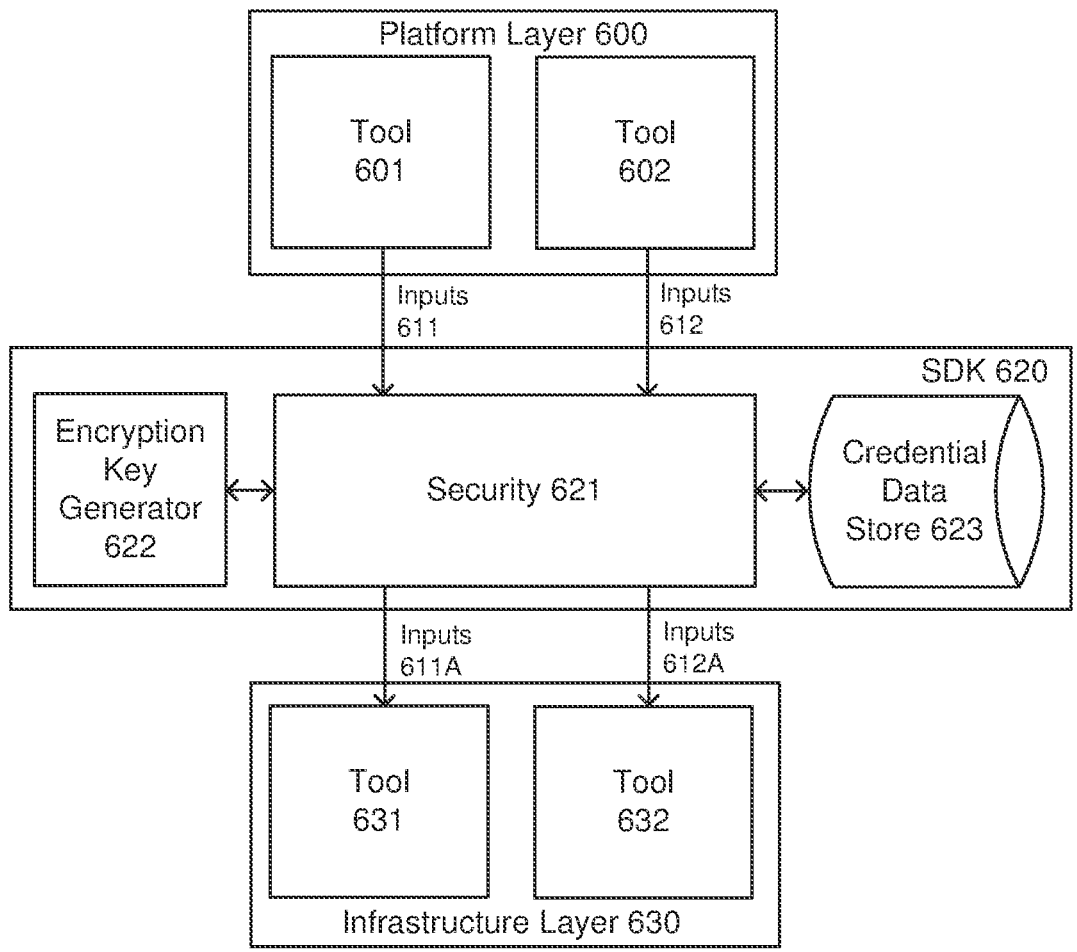
FIG. 6 illustrates example security functions of a machine learning development hub, in accordance with one or more embodiments described herein.

FIG. 6 illustrates example security functions of a machine learning development hub, in accordance with one or more embodiments described herein. FIG. 6 includes a platform layer 600 comprising example tools 601 and 602, an example SDK 620 comprising security 621, encryption key generator 622, and credential data store 623, and an infrastructure layer 630 comprising example tools 631 and 632.

In FIG. 6, the platform layer 600 can implement, e.g., a platform layer 110 or 200. The SDK 620 can implement, e.g., an SDK 271 or 300. The infrastructure layer 630 can implement, e.g., the access and compute infrastructure 280.

Platform layer 600 can include or reference tools 601 and 602, which correspond to tools 631 and 632 supported in the infrastructure layer 630.

FIG. 6 illustrates an SDK 620 comprising a credential data store 623 and security 621 configured to use the credential data store 623 to access infrastructure layer 630. The credential data store 623 can be implemented, e.g., as a key-value store as described herein. When SDK 620 provides inputs, e.g., inputs 612A, to an element of infrastructure layer 630 such as tool 632, security 621 can use appropriate corresponding credentials (corresponding to tool 632) to access a user account for use with tool 632. After gaining access to the user account, the SDK 620 can supply the inputs 612A to the tool 632.

In another aspect, FIG. 6 illustrates an SDK 620 comprising an encryption key generator 622 that can be used to dynamically secure transmissions of inputs 611A, 612A to components of the infrastructure layer 630. The encryption key generator 622 can dynamically generate encryption keys for use with different discrete transactions between the SDK 620 and the infrastructure layer 630.

Figure 7:
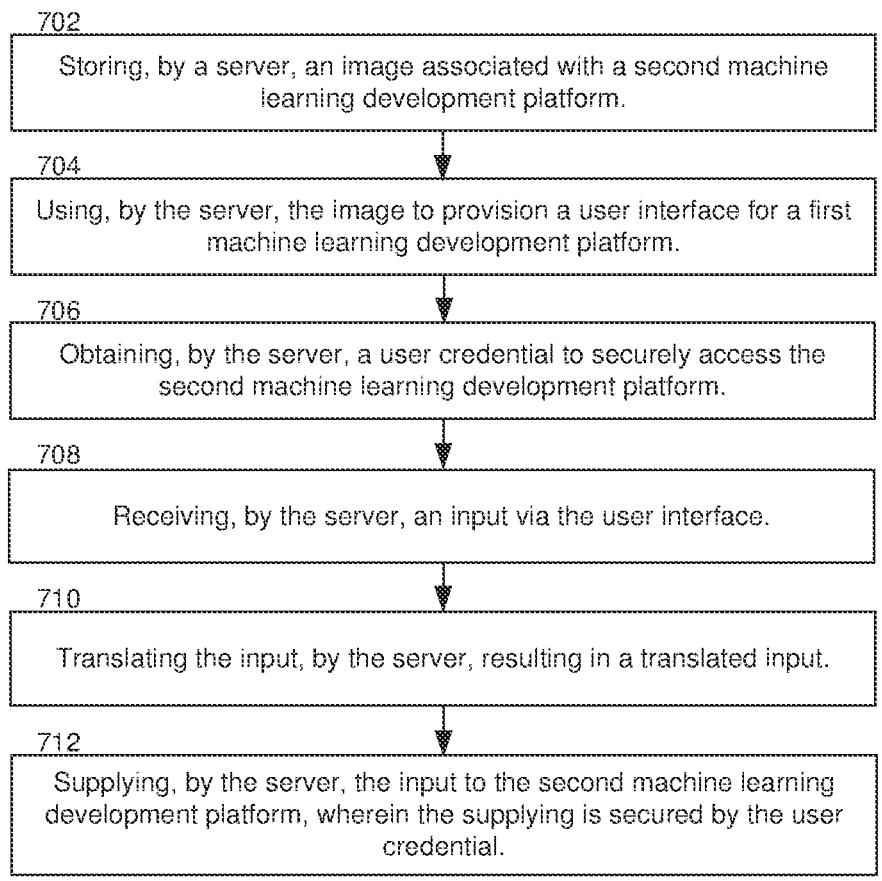
FIG. 7 is a flow diagram of an example, non-limiting computer implemented method that can be performed by a machine learning development hub, in accordance with one or more embodiments described herein.

FIG. 7 is a flow diagram of an example, non-limiting computer implemented method that can be performed by a machine learning development hub, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by a server or cluster that provides a machine learning development hub, such as the machine learning development hub 100 illustrated in FIG. 1. Operation 702 comprises storing, by a server, an image associated with a second machine learning development platform. For example, an image associated with any of the infrastructure platforms 141, 142, 143 can be stored in an artifact storage 330.

Operation 704 comprises using, by the server, the image to provision a user interface for a first machine learning development platform. The image stored in artifact storage 330 can be used to provision a user interface such as platform UI 400.

Operation 706 comprises obtaining, by the server, a user credential to securely access the second machine learning development platform. For example, a user credential can be obtained to securely access infrastructure platform 141. The user credential can be obtained from a user, e.g. as a user input to selector 114. In some embodiments, the user credential can be stored in a credential data store 623, which can optionally be implemented as a key-value store.

Operation 708 comprises receiving, by the server, an input via the user interface. For example, any of inputs 111, 112, 113 can be received via the platform UI 400. The input can comprise, e.g., training data usable to train a machine learning model, a data modification instruction to modify training data usable to train a machine learning model, a compute instruction that specifies compute operations to be performed by a machine learning model, and/or a performance monitoring instruction that specifies performance monitoring of a machine learning model.

Operation 710 comprises translating the input, by the server, resulting in a translated input. Operation 710 is optional as not all inputs need be translated. A translator 121, 122, 123 can be used to translate an input 101, 102, 103 into a translated input 101A, 102A, 102B, 103A. In some embodiments, an architecture such as illustrated in FIG. 3 can be used to effect translation as needed.

Operation 712 comprises supplying, by the server, the input (as optionally translated at block 710) to the second machine learning development platform, wherein the supplying is secured by the user credential. For example, the ML development hub 100 can supply any of translated inputs 101A, 102A, 102B, 103A to any of infrastructure platforms 141, 142, 143. The supplying can be secured by the user credential obtained at block 706. In some embodiments, operation 712 can be performed automatically, i.e., without user initiation other than providing an input 101 to the platform layer 110. ML development hub 100 can automatically initiate operation 712 in response to receiving the input 101.

Furthermore, in some embodiments, as shown in FIG. 5, supplying the input, e.g., translated inputs 511A to the second machine learning development platform (infrastructure layer 530) can comprise supplying, via a first microservice 501 associated with the first machine learning development platform (platform layer 500), the input 511A to a second microservice 531 associated with the second machine learning development platform (infrastructure layer 530). Also, as shown in FIG. 6, supplying an input 611A to a second machine learning development platform (at infrastructure layer 630) can be further secured by an encryption key generated by encryption key generator 622 in response to receiving the input 611.

Figure 8:
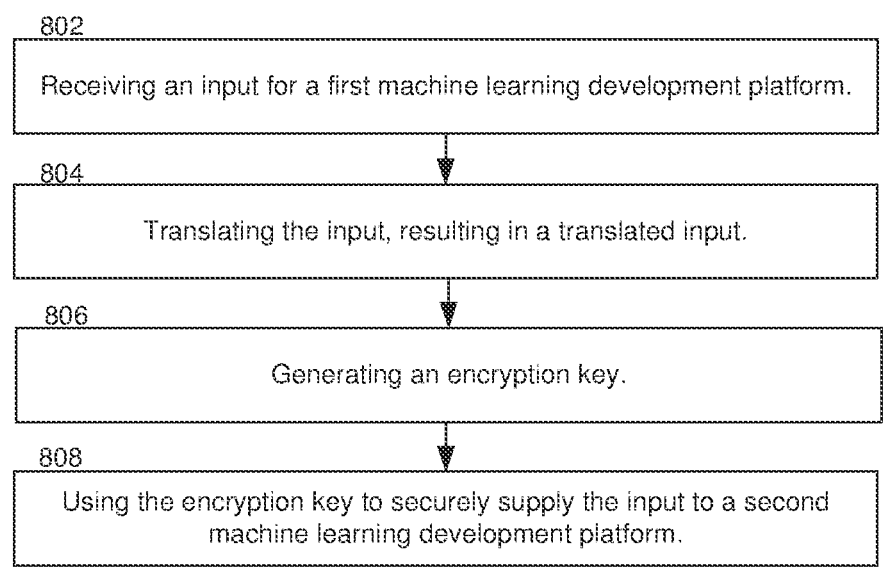
FIG. 8 is a flow diagram of another example, non-limiting computer implemented method that can be performed by a machine learning development hub, in accordance with one or more embodiments described herein.

FIG. 8 is a flow diagram of another example, non-limiting computer implemented method that can be performed by a machine learning development hub, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by a server or cluster that provides a machine learning development hub, such as the machine learning development hub 100 illustrated in FIG. 1. Example operation 802 comprises receiving an input for a first machine learning development platform. For example, an input 101 can be received for platform layer 110. The input 101 can be received via a user interface for the first machine learning development platform, such as platform UI 400.

Operations 804, 806, and 808 can be performed in response to receiving the input 101 at block 802. Example operation 804 comprises translating the input 101, resulting in a translated input 101A. Operation 804 can be optional as noted above regarding operation 710.

Example operation 806 comprises generating an encryption key. For example, an encryption key generator 622 can be used to dynamically generate an encryption key. Example operation 808 comprises using the encryption key to securely supply the input 101 or 101A to a second machine learning development platform, e.g., to infrastructure platform 141. In some embodiments, securely supplying the input 101 or 101A to the second machine learning development platform 141 can comprise operations such as illustrated in FIG. 5, e.g., supplying, using a first microservice 501 associated with the first machine learning development platform 500, the input 101 or 101A to a second microservice 531 associated with the second machine learning development platform 141.

Figure 9:
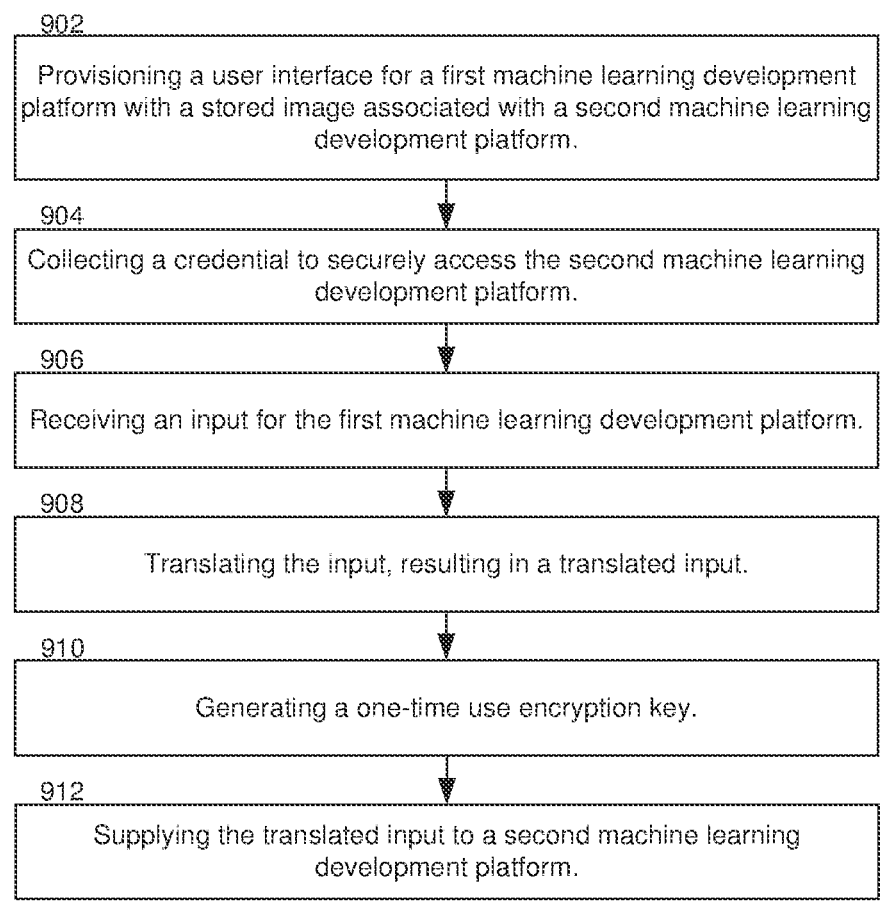
FIG. 9 is a flow diagram of another example, non-limiting computer implemented method that can be performed by a machine learning development hub, in accordance with one or more embodiments described herein.

FIG. 9 is a flow diagram of another example, non-limiting computer implemented method that can be performed by a machine learning development hub, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be reordered, combined, removed or supplemented with other operations in some embodiments.

In an embodiment, the method illustrated in FIG. 9 can be performed by a server or cluster that provides a machine learning development hub, such as the machine learning development hub 100 illustrated in FIG. 1. Example operation 902 comprises provisioning a user interface for a first machine learning development platform with a stored image associated with a second machine learning development platform. For example, a platform UI 400 for a platform layer 200 can be provisioned with an image stored in artifact storage 330, wherein the image can be associated with a second machine learning development platform, such as infrastructure platform 141.

Example operation 904 comprises collecting a credential to securely access the second machine learning development platform. For example, a credential can be collected via a user input and stored in the credential data storage 623.

Example operation 906 comprises receiving an input for the first machine learning development platform. For example, an input 101 can be received for the machine learning development platform enabled by platform layer 110. The input 101 can comprise, e.g., at least one of training data for training a machine learning model, a data modification instruction to modify training data employable to train the machine learning model, or any of the other various potential inputs described herein. In some embodiments, receiving the input 101 for the first machine learning development platform can be conducted via a first API, such as platform API 310.

Operations 908-912 can be performed automatically without direct user initiation, in response to receiving the input at block 906. Example operation 908 comprises translating the input 101, resulting in a translated input 101A. Example operation 908 can be optional as explained above. Example operation 910 comprises generating a one-time use encryption key. For example, encryption key generator 622 can be activated to generate the one-time use encryption key.

Example operation 912 comprises supplying the translated input 101A to a second machine learning development platform, e.g., to infrastructure platform 141. Operation 912 can be secured by the encryption key generated at block 910. Supplying the translated input 101A to the second machine learning development platform 141 can also be secured by the credential collected at block 904. In some embodiments, translating the input 101 and supplying the translated input 101A to the second machine learning development platform 141 can be conducted via a second API, e.g., the orchestrator API 320 illustrated in FIG. 3.

Figure 10:
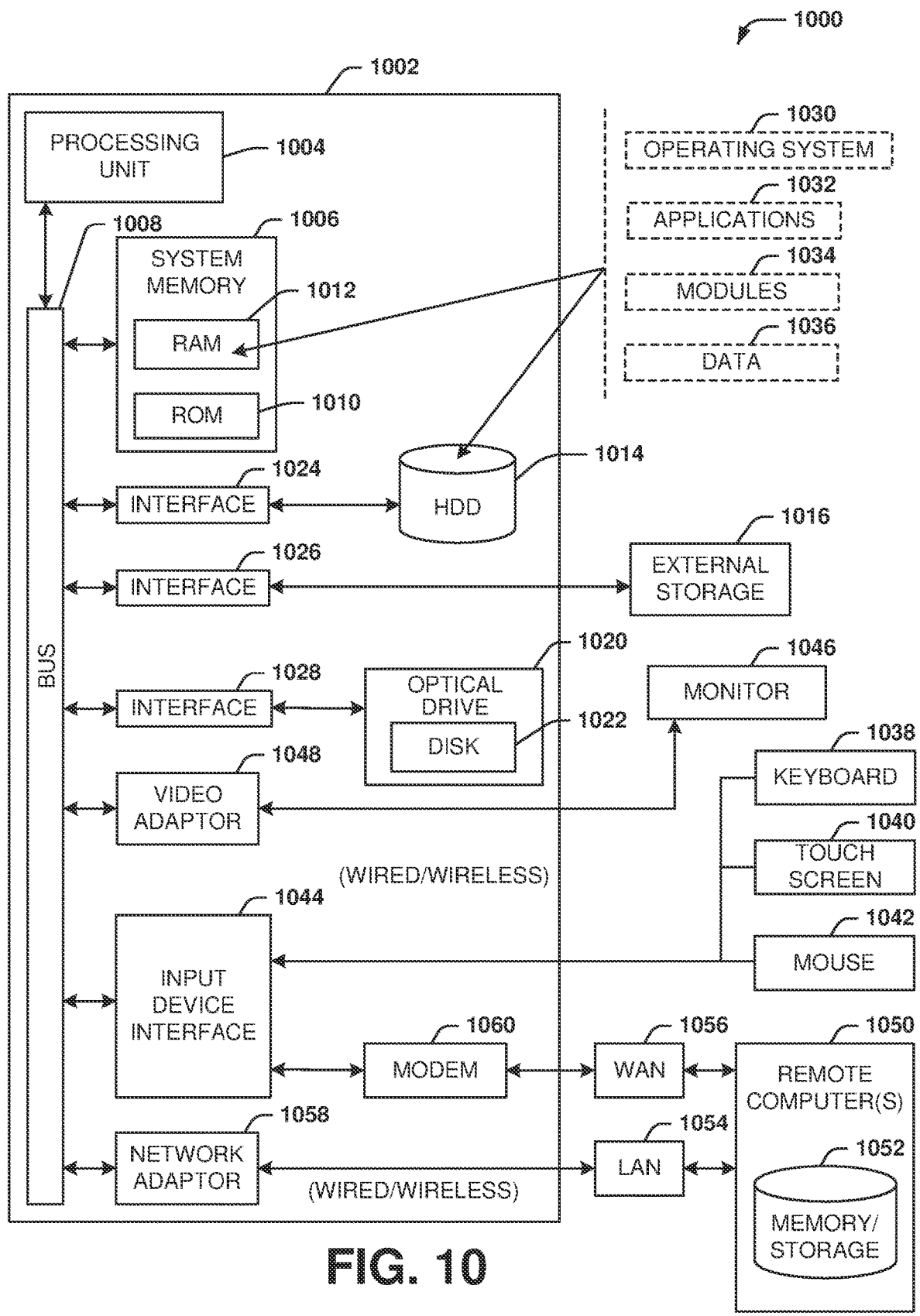
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/ wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
provisioning, by a server comprising a processor, a workspace comprising:
a first user interface for a first machine learning development platform that employs a first type of machine learning development tool for generating machine learning models, and
a second user interface for a second machine learning development platform that employs a second type of machine learning development tool that is different from the first type of machine learning development tool for generating machine learning models, wherein the first machine learning development platform is distinct from the second machine learning development platform;
obtaining, by the server, a user credential to securely access the second machine learning development platform;
receiving, by the server, an input via the first user interface; and
supplying, by the server, the input to the second machine learning development platform for generating a machine learning model, wherein the supplying is secured by the user credential.

2. The method of claim 1, wherein supplying the input to the second machine learning development platform is performed in response to receiving the input.

3. The method of claim 1, further comprising storing, by the server, an image associated with the second machine learning development platform, and using, by the server, the image to provision the second user interface.

4. The method of claim 1, further comprising translating the input, by the server, resulting in a translated input, and wherein supplying the input to the second machine learning development platform comprises supplying the translated input.

5. The method of claim 1, wherein supplying the input to the second machine learning development platform comprises supplying, via a first microservice associated with the first machine learning development platform, the input to a second microservice associated with the second machine learning development platform.

6. The method of claim 1, wherein supplying the input to the second machine learning development platform is further secured by an encryption key generated in response to receiving the input.

7. The method of claim 1, wherein the user credential is stored in a key-value store.

8. The method of claim 1, wherein the input comprises training data usable to train the machine learning model.

9. The method of claim 1, wherein the input comprises a data modification instruction to modify training data usable to train the machine learning model.

10. The method of claim 1, wherein the input comprises a compute instruction that specifies compute operations to be performed by the machine learning model.

11. The method of claim 1, wherein the input comprises a performance monitoring instruction that specifies performance monitoring of the machine learning model.

12. A server, comprising:
a processor; and
a memory that stores executable instructions that, when executed by the processor, facilitate performance of operations, the operations comprising:
provisioning a workspace comprising:
a first user interface for a first machine learning development platform that employs a first type of machine learning development tool for generating machine learning models, and
a second user interface for a second machine learning development platform that employs a second type of machine learning development tool that is different from the first type of machine learning development tool for generating machine learning models, wherein the first machine learning development platform is distinct from the second machine learning development platform;
receiving an input for the first machine learning development platform; and
in response to receiving the input,
generating an encryption key; and
using the encryption key to securely supply the input to the second machine learning development platform for generating a machine learning model.

13. The server of claim 12, wherein the input is received via the first user interface for the first machine learning development platform.

14. The server of claim 12, wherein the operations further comprise translating the input, resulting in a translated input, and wherein securely supplying the input to the second machine learning development platform comprises supplying the translated input.

15. The server of claim 12, wherein securely supplying the input to the second machine learning development platform comprises supplying, using a first microservice associated with the first machine learning development platform, the input to a second microservice associated with the second machine learning development platform.

16. A non-transitory machine-readable medium, comprising executable instructions that, when executed by a processor, facilitate performance of operations, the operations comprising:
provisioning a workspace comprising:
a first user interface for a first machine learning development platform that employs a first type of machine learning development tool for generating machine learning models, and
a second user interface for a second machine learning development platform that employs a second type of machine learning development tool that is different from the first type of machine learning development tool for generating machine learning models, wherein the first machine learning development platform is distinct from the second machine learning development platform;
receiving an input for the first machine learning development platform, wherein the input comprises at least one of training data for training a machine learning model or a data modification instruction to modify training data employable to train the machine learning model; and
in response to receiving the input:
translating the input, resulting in a translated input; and
supplying the translated input to the second machine learning development platform for generating the machine learning model.

17. The non-transitory machine-readable medium of claim 16, wherein the operations further comprise collecting a credential to securely access the second machine learning development platform, and wherein supplying the translated input to the second machine learning development platform is secured by the credential.

18. The non-transitory machine-readable medium of claim 16, wherein the operations further comprise, in further response to receiving the input, generating a one-time use encryption key to securely perform the supplying of the translated input to the second machine learning development platform.

19. The non-transitory machine-readable medium of claim 16, wherein receiving the input for the first machine learning development platform is conducted via a first application programming interface, and wherein translating the input and supplying the translated input to the second machine learning development platform is conducted via a second application programming interface.

20. The non-transitory machine-readable medium of claim 16, wherein the operations further comprise storing an image associated with the second machine learning development platform, and using the image to provision the second user interface.

* * * * *